US010941917B2

(12) United States Patent
Kogure

(10) Patent No.: US 10,941,917 B2
(45) Date of Patent: Mar. 9, 2021

(54) LIGHTING TOOL FOR VEHICLE

(71) Applicant: Stanley Electric Co., Ltd., Tokyo (JP)

(72) Inventor: Shinya Kogure, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/613,704

(22) PCT Filed: May 18, 2018

(86) PCT No.: PCT/JP2018/019331
§ 371 (c)(1),
(2) Date: Nov. 14, 2019

(87) PCT Pub. No.: WO2018/216622
PCT Pub. Date: Nov. 29, 2018

(65) Prior Publication Data

US 2020/0292145 A1 Sep. 17, 2020

(30) Foreign Application Priority Data

May 24, 2017 (JP) ............................ JP2017-102638

(51) Int. Cl.
*B60Q 3/00* (2017.01)
*F21S 41/64* (2018.01)
(Continued)

(52) U.S. Cl.
CPC ............ *F21S 41/64* (2018.01); *F21S 41/143* (2018.01); *F21S 41/265* (2018.01); *F21S 41/43* (2018.01);
(Continued)

(58) Field of Classification Search
CPC .......... F21S 41/64; F21S 41/43; F21S 41/143; F21S 41/50; F21S 41/265; F21S 45/00; F21V 7/08; F21V 5/04
(Continued)

(56) References Cited

U.S. PATENT DOCUMENTS

2010/0277940 A1* 11/2010 Ishida .................... F21S 41/60
362/538
2011/0013412 A1 1/2011 Kobayashi
(Continued)

FOREIGN PATENT DOCUMENTS

DE 102012024625 A1 6/2014
JP 2005-183090 A 7/2005
(Continued)

OTHER PUBLICATIONS

International Search Report of the International Search Report for PCT/JP2018/019331 dated Aug. 7, 2018.

*Primary Examiner* — Ali Alavi
(74) *Attorney, Agent, or Firm* — Kenealy Vaidya LLP

(57) ABSTRACT

A lighting tool for a vehicle configured to radiate light toward a side in front of a vehicle includes: a light radiation unit having a light source main body; a first optical system configured to condense light radiated from the light radiation unit; and a cover member disposed in front of the first optical system and configured to overlap at least a part of the first optical system when seen from the front, wherein an opening disposed on an optical axis of the first optical system is provided in the cover member.

19 Claims, 6 Drawing Sheets

(51) Int. Cl.

| | |
|---|---|
| ***F21S 41/265*** | (2018.01) |
| ***F21S 41/143*** | (2018.01) |
| ***F21S 45/00*** | (2018.01) |
| ***F21S 41/43*** | (2018.01) |
| ***F21S 41/50*** | (2018.01) |
| ***F21V 5/04*** | (2006.01) |
| ***F21V 7/08*** | (2006.01) |

(52) U.S. Cl.
CPC ............... *F21S 41/50* (2018.01); *F21S 45/00* (2018.01); *F21V 5/04* (2013.01); *F21V 7/08* (2013.01)

(58) Field of Classification Search
USPC .......................................................... 362/459
See application file for complete search history.

(56) References Cited

U.S. PATENT DOCUMENTS

| | | | | |
|---|---|---|---|---|
| 2013/0114283 | A1 | 5/2013 | Kawanobe et al. | |
| 2017/0016586 | A1* | 1/2017 | Tsuda .................... | F21S 41/321 |
| 2017/0227184 | A1* | 8/2017 | Ishida ................... | F21S 41/365 |
| 2018/0106447 | A1* | 4/2018 | Tanaka .................. | F21S 41/147 |
| 2019/0113197 | A1* | 4/2019 | Kamiya ................ | F21S 43/249 |

FOREIGN PATENT DOCUMENTS

| | | | |
|---|---|---|---|
| JP | 2011-23157 | A | 2/2011 |
| JP | 2012-507823 | A | 3/2012 |
| JP | 2013-101881 | A | 5/2013 |
| JP | 5812283 | B2 | 11/2015 |

* cited by examiner

LIGHTING TOOL FOR VEHICLE

CROSS-REFERENCE TO RELATED APPLICATIONS

This application is a U.S. National Stage Application under 35 U.S.C § 371 of International Patent Application No. PCT/JP2018/019331 filed May 18, 2018, which claims the benefit of priority to Japanese Patent Application No. 2017-102638 filed May 24, 2017, the disclosures of all of which are hereby incorporated by reference in their entireties.

TECHNICAL FIELD

The present invention relates to a lighting tool for a vehicle.

Priority is claimed on Japanese Patent Application No. 2017-102638, filed on May 24, 2017, the contents of which are incorporated herein by reference.

BACKGROUND

Patent Document 1 discloses a lighting tool for a vehicle aimed at reducing a thickness in order to enhance design properties. In the lighting tool for a vehicle, light reflected by a concave reflecting surface is projected to a side in front of a vehicle as parallel light or light close to parallel light by a projection lens.

RELATED ART DOCUMENTS

Patent Documents

[Patent Document 1]
Japanese Patent No. 5812283

SUMMARY OF INVENTION

Problems to be Solved by the Invention

In a structure in the related art, a projection lens needs to be exposed at the front of a vehicle, and the projection lens functions as a substantially designed surface. For this reason, the size of the appearance of the lighting tool for a vehicle (i.e., a size of a designed surface) is limited by the size of the projection lens, and thus it is difficult to make the lighting tool for a vehicle to appear compact.

An aspect of the present invention is directed to providing a lighting tool for a vehicle which can appear compact, and has enhanced design properties.

Means for Solving the Problem

A lighting tool for a vehicle according to an aspect of the present invention is a lighting tool for a vehicle configured to radiate light toward a side in front of a vehicle, the lighting tool for a vehicle including a light radiation unit having a light source main body; a first optical system configured to condense light radiated from the light radiation unit; and a cover member disposed in front of the first optical system and configured to overlap at least a part of the first optical system when seen from the front, wherein an opening disposed on an optical axis of the first optical system is provided in the cover member.

According to this configuration, since the cover member that overlaps at least a part of the first optical system is provided in front of the first optical system, an internal structure is shielded from the front, and a lighting tool for a vehicle having enhanced design properties can be realized. In addition, the opening disposed on the optical axis of the first optical system is provided in the cover member. The light radiated from the light radiation unit enters the first optical system, is condensed on the optical axis of the first optical system, and passes through the opening of the cover member. Accordingly, the light radiated in front is not shielded by the cover member. In addition, according to this configuration, since the forward surface of the cover member functions as a designed surface, a size of the designed surface can be determined without being restricted to a size of the first optical system. Accordingly, it is possible to provide a lighting tool for a vehicle having enhanced design properties and a compact appearance.

In the above-mentioned lighting tool for a vehicle, the opening may be disposed at a condensing point in front of the first optical system.

According to this configuration, since the opening of the cover member is disposed at the condensing point where most light is condensed, the opening can be reduced in size. As a result, it is possible to enhance an effect of the cover member, making it difficult for the internal structure of the lighting tool for a vehicle to be seen.

In the above-mentioned lighting tool for a vehicle, the light radiation unit may radiate light radiated from the light source main body as parallel light.

According to this configuration, the light can be clearly condensed in the first optical system as the light radiation unit radiates the light as parallel light.

In the above-mentioned lighting tool for a vehicle, the parallel light may have a distribution with an illuminance gradient.

According to this configuration, it is possible to form a light distribution pattern with an illuminance gradient in which illuminance decreases going outward from a high illuminance region.

In the above-mentioned lighting tool for a vehicle, the light radiation unit may have: a light source unit having the light source main body and configured to radially radiate light from a diffusion center; and a second optical system configured to cause the light radiated from the light source unit to become the parallel light.

According to this configuration, it is possible to constitute the light radiation unit by including the light source unit and the second optical system configured to cause the light radially radiated from the diffusion center of the light source unit to become parallel light.

In the above-mentioned lighting tool for a vehicle, the second optical system may have: an incident surface into which the light radiated from the light source unit enters and which is configured to cause the incident light to become primary light passing through the second optical system; and a light emission surface configured to emit secondary light parallel to an optical axis of the second optical system, and a diffusion angle of a horizontal component of the primary light may be larger than a diffusion angle of a component of the primary light in a vertical direction.

According to this configuration, the second optical system refracts the light entering the incident surface, and increases the diffusion angle in the horizontal direction with respect to the diffusion angle in the vertical direction. Accordingly, the light distribution pattern of the light emitted from the light emission surface as parallel light can be widened in the horizontal direction, and a preferable light distribution pattern for the lighting tool for a vehicle can be formed.

In the above-mentioned lighting tool for a vehicle, a vertical component of the incident surface may have a hyperbolic shape that causes a hyperbolic focus to coincide with the diffusion center.

According to this configuration, since the vertical component of the incident surface has a hyperbolic shape in which the diffusion center is a hyperbolic focus, the vertical component of the primary light can become parallel light. The second optical system can minimize expansion of the light distribution pattern in the vertical direction by causing the vertical component of the light to become parallel light in the incident surface.

In the above-mentioned lighting tool for a vehicle, a horizontal component of the incident surface may have a hyperbolic shape that causes a hyperbolic focus to coincide with the diffusion center in a vicinity of the optical axis of the second optical system, and have a shape that moves rearward from a hyperbolic shape going outward from the optical axis of the second optical system in a horizontal direction.

According to this configuration, since the horizontal component of the incident surface has a hyperbolic shape in which the diffusion center is the hyperbolic focus in the vicinity of the optical axis of the second optical system, the horizontal component of the primary light can be brought close to parallel light in the vicinity of the optical axis of the second optical system. Accordingly, the density of a light flux emitted from the light emission surface can be increased in the vicinity of the optical axis of the second optical system, and a light distribution pattern in which the vicinity of the center in the horizontal direction is brightened can be realized. In addition, according to the above-mentioned configuration, the horizontal component of the incident surface moves rearward from the hyperbolic shape as it is separated outward from the optical axis of the second optical system in the horizontal direction. Accordingly, the diffusion angle can be increased in the horizontal component of the primary light going outward from the optical axis of the second optical system in the horizontal direction. The second optical system can realize a light distribution pattern appropriate for a vehicle by diffusing a region of light outside in the horizontal component of light and increasing expansion of the light distribution pattern in the horizontal direction.

In the above-mentioned lighting tool for a vehicle, the light source unit may have the light source main body and an elliptical reflecting surface configured to reflect the light radiated from the light source main body and radiate the light toward the second optical system, the elliptical reflecting surface may be configured in an elliptical shape with reference to a pair of elliptical focuses, and the light source main body may be disposed on one of the pair of elliptical focuses and the other of the pair of elliptical focuses may function as the diffusion center.

According to this configuration, a Lambertian-emitted light beam radiated from the light source main body disposed on an elliptical focus on one side of the elliptical reflecting surface can be condensed at the other elliptical focus, and can enter the second optical system at a narrower angle than that of the light radiated from the light source main body. Accordingly, a light intensity in the vicinity of the optical axis can be increased to form a high illuminance region in the vicinity of the optical axis of the second optical system while the light can efficiently enter the second optical system.

The above-mentioned lighting tool for a vehicle may include an image light-forming device disposed in a route of light from the light source main body to the first optical system and configured to modulate light to form image light.

According to this configuration, by providing the image light-forming device in a route of the light from the light source main body to the first optical system, the light entering the condensing optical system can become the image light, and the light distribution pattern radiated in front can be changed over time. That is, according to this configuration, the lighting tool for a vehicle can perform adaptive driving beam (ADB) control.

In the above-mentioned lighting tool for a vehicle, the image light-forming device may be a liquid crystal panel, and the liquid crystal panel may be disposed between the light radiation unit and the first optical system.

According to this configuration, the light distribution pattern can be generated by the liquid crystal panel using the parallel light radiated from the light radiation unit, and the generated light distribution pattern can be radiated in front.

In the above-mentioned lighting tool for a vehicle, the liquid crystal panel may be disposed to be perpendicular to the optical axis of the first optical system at a condensing point behind the first optical system.

The above-mentioned lighting tool for a vehicle projects the image light passing through the condensing point behind the first optical system toward the front as the light distribution pattern. Meanwhile, in the light radiation unit, since it is difficult to form only completely parallel light, the light radiated from the light radiation unit partly includes non-parallel light. When the liquid crystal panel is not disposed at the condensing point behind the first optical system, the non-parallel light radiated from the light radiation unit passes through the condensing point on the rear to make the image light unclear, and accordingly, the light distribution pattern in front may become unclear. According to the above-mentioned configuration, since the liquid crystal panel is disposed to be perpendicular to the optical axis of the first optical system at the condensing point behind the first optical system, the non-parallel light also passes through the liquid crystal panel in a perpendicular plane passing through the condensing point. Accordingly, a clearer light distribution pattern can be formed.

Advantage of the Invention

According to the lighting tool for a vehicle of the aspect of the present invention, it is possible to provide a lighting tool for a vehicle having better design properties and a compact appearance.

DESCRIPTION OF THE EMBODIMENTS

Figure 1:
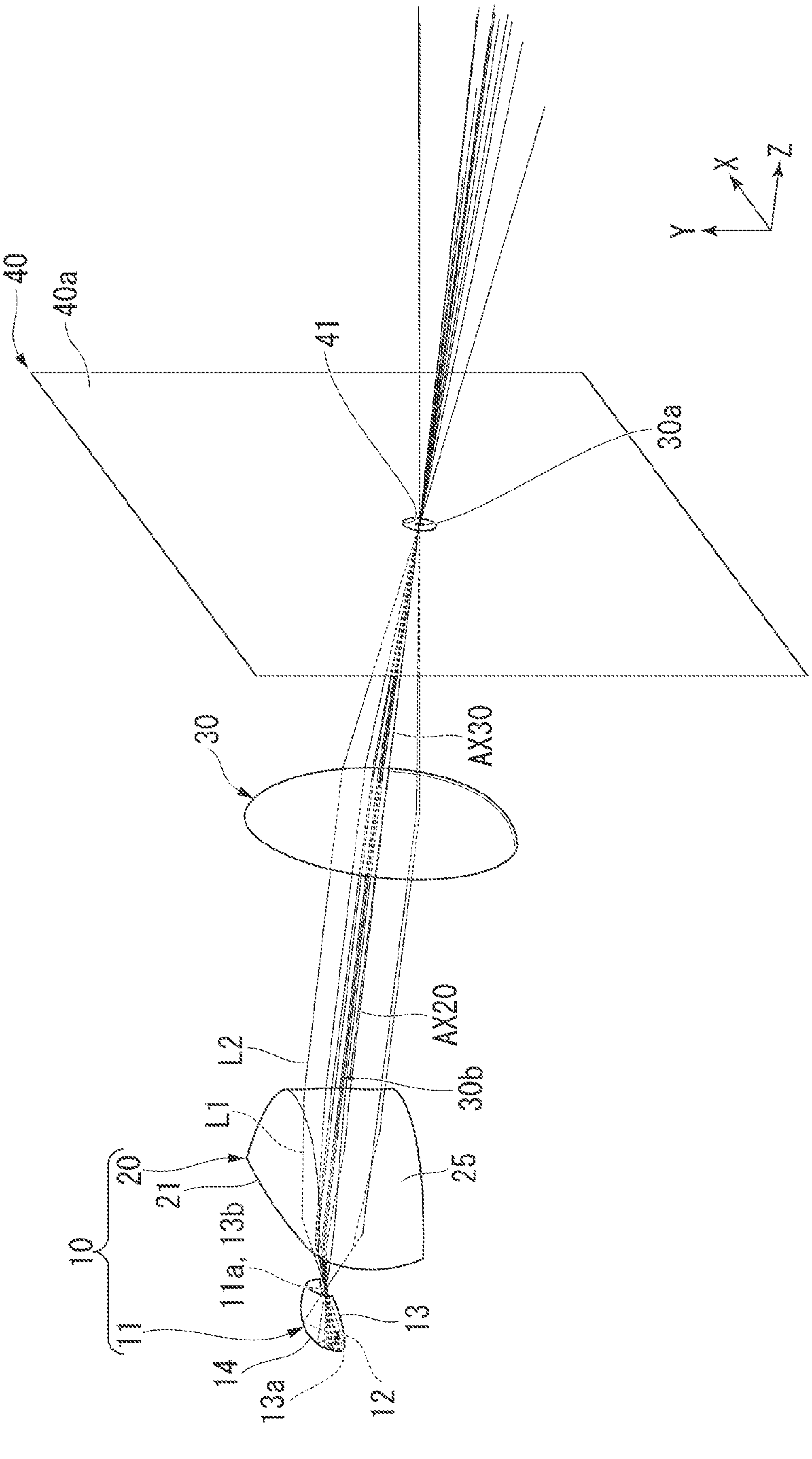
FIG. 1 is a perspective view schematically showing a lighting tool for a vehicle according to a first embodiment.

Hereinafter, a lighting tool for a vehicle according to an embodiment of the present invention will be described with reference to the accompanying drawings.

In the drawings used in the following description, in order to make features easier to understand, feature portions may be enlarged for the sake of convenience, and dimensional ratios or the like of components are not always the same as the actual ones.

In the drawings used in the description of the embodiment, an XYZ coordinate system may be used as a 3-dimensional orthogonal coordinate system. Hereinafter, in the XYZ coordinate system, a Z-axis direction is referred to as a vehicle forward/rearward direction, an X-axis direction is referred to as a vehicle leftward/rightward direction, a Y-axis direction is referred to as a vehicle upward/downward direction, a +Z side is referred to as a side in front of a vehicle, a −Z side is referred to as a side behind the vehicle, a +Y side is simply referred to as an upward side, and a −Y side is simply referred to as a downward side.

First Embodiment

Figure 2:
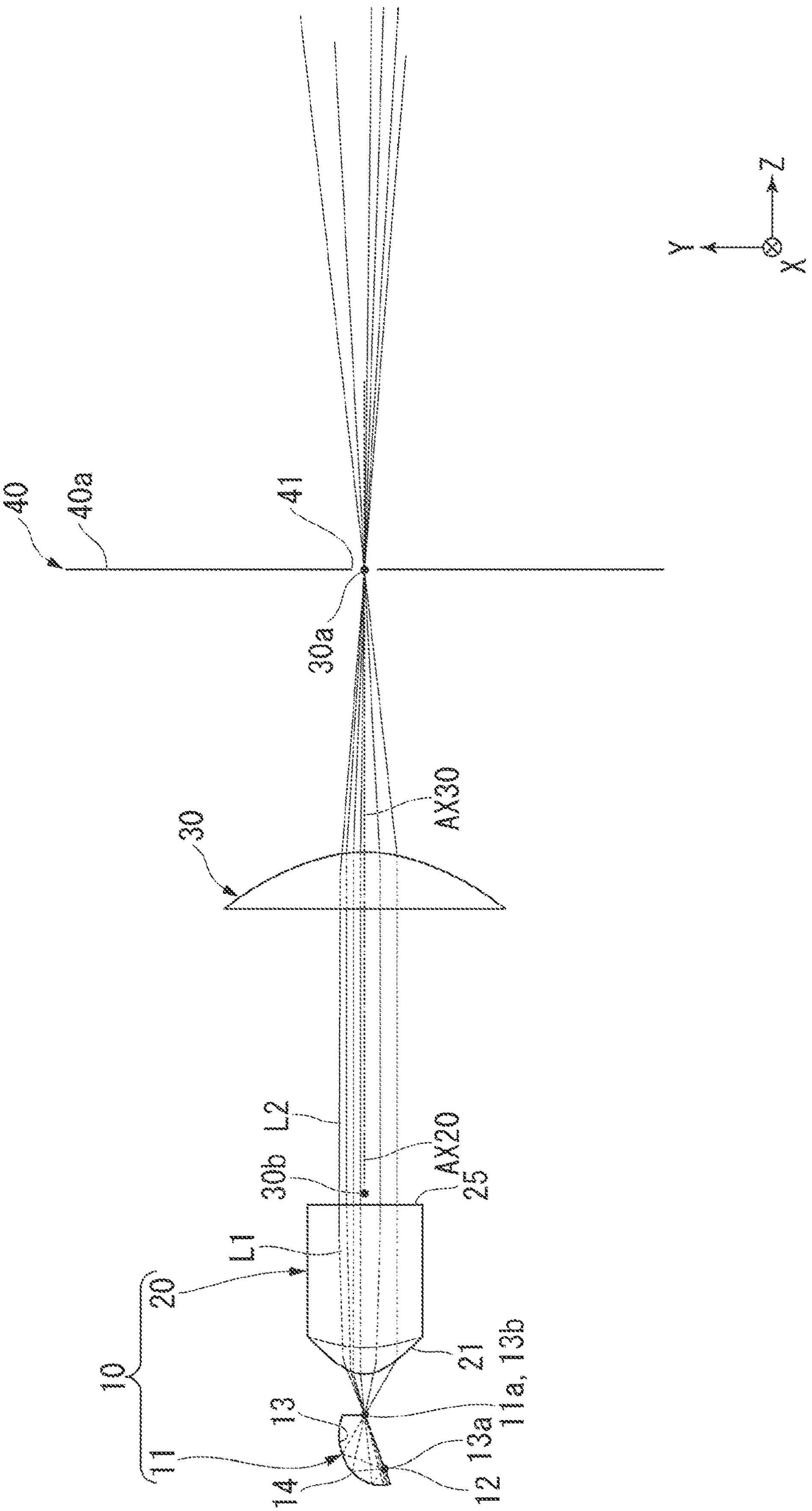
FIG. 2 is a side view schematically showing the lighting tool for a vehicle according to the first embodiment.
Figure 3:
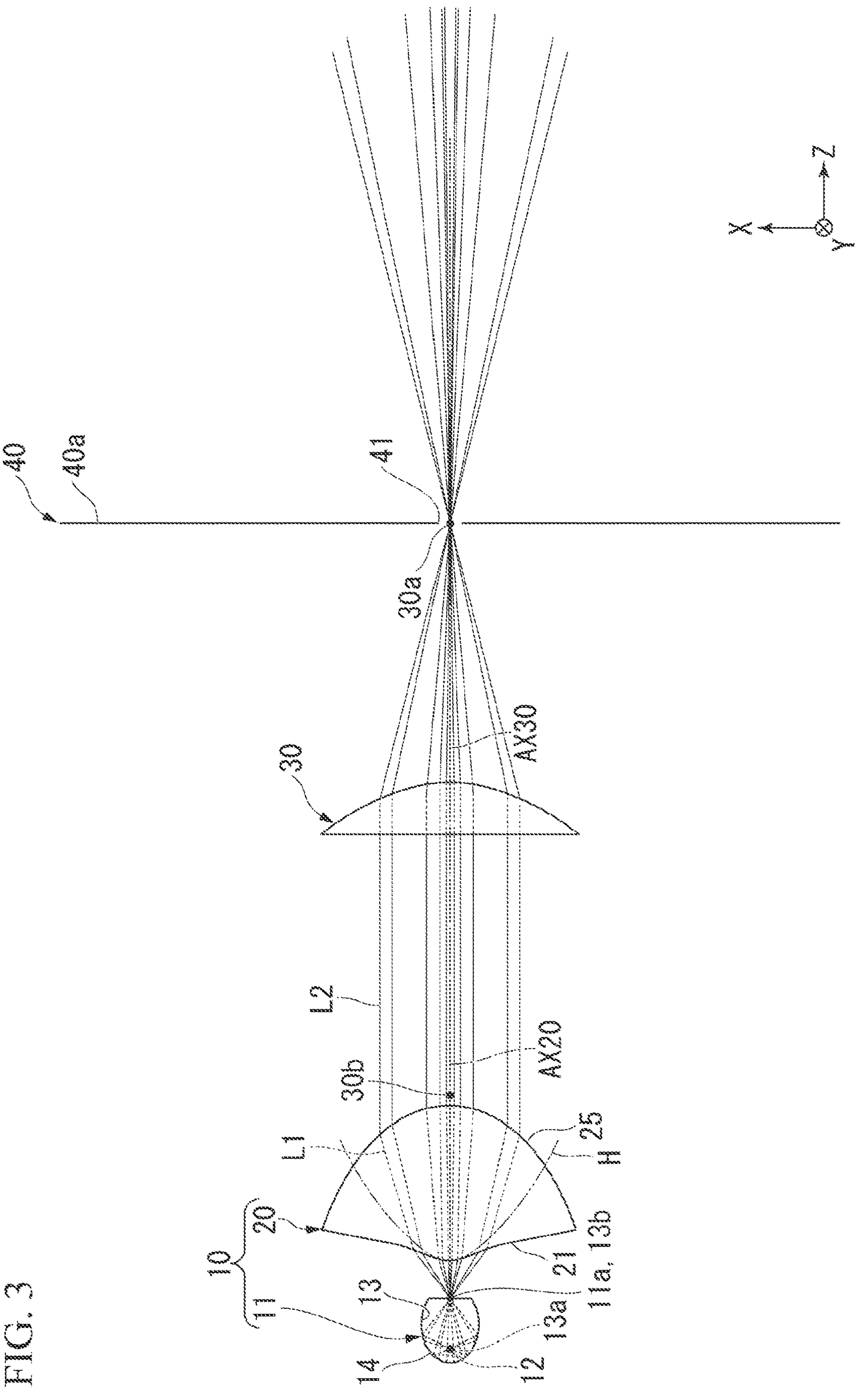
FIG. 3 is a plan view schematically showing the lighting tool for a vehicle according to the first embodiment.

FIG. 1, FIG. 2 and FIG. 3 are views schematically showing a lighting tool 1 for a vehicle according to a first embodiment, FIG. 1 is a perspective view, FIG. 2 is a side view, and FIG. 3 is a plan view. The lighting tool 1 for a vehicle of the embodiment is mounted on a vehicle and radiates light to a side in front of the vehicle (in the +Z direction).

The lighting tool 1 for a vehicle includes a light radiation unit 10, a condensing lens (a first optical system) 30, and a cover member 40 in which an opening 41 is formed. In addition, the lighting tool 1 for a vehicle may include an outer lens (not shown) in front of the cover member 40. In the lighting tool 1 for a vehicle, parallel light is radiated from the light radiation unit 10. The parallel light is condensed by the condensing lens 30, and passes through the opening 41 of the cover member 40 to be radiated forward.

<Light Radiation Unit>

The light radiation unit 10 has a light source main body 12. The light radiation unit 10 radiates light radiated from the light source main body 12 toward the condensing lens 30 as parallel light. The light radiation unit 10 has a light source unit 11 configured to radially radiate light from a diffusion center 11*a*, and a collimating lens (a second optical system) 20 configured to align the light radiated from the light source unit 11 to parallel light. In addition, the light source unit 11 includes the light source main body 12 and a reflecting member 14.

The light source main body 12 radiates a Lambertian-emitted light beam with a central axis facing upward. The Lambertian-emitted light beam radiated from the light source main body 12 is radiated forward by the reflecting member 14. A light-emitting diode (LED) light source or a laser light source may be employed as the light source main body 12.

The reflecting member 14 has an elliptical reflecting surface 13 configured to reflect the light radiated from the light source main body 12 and radiate the light toward the collimating lens 20. That is, the light source unit 11 has the elliptical reflecting surface 13. The elliptical reflecting surface 13 covers the light source main body 12 from above. The elliptical reflecting surface 13 includes an elliptical sphere shape obtained by an elliptical shape with reference to a pair of elliptical focuses 13*a* and 13*b* being rotated with reference to a long axis that passes through the pair of elliptical focuses 13*a* and 13*b*.

The light source main body 12 is disposed on a first elliptical focus 13*a* located on a rear side of the pair of elliptical focuses 13*a* and 13*b*. Due to a property of an ellipse, the light radiated from the first elliptical focus 13*a* that is one of the elliptical focuses is reflected by the elliptical reflecting surface 13 and condensed to a second elliptical focus 13*b* that is the other elliptical focus. Accordingly, the light radiated from the light source main body 12 is condensed on the second elliptical focus 13*b* and radially radiated toward the collimating lens 20 using the second elliptical focus 13*b* as the diffusion center 11*a*. The second elliptical focus 13*b* functions as the diffusion center 11*a* of the light source unit 11.

According to the embodiment, the light source unit 11 disposed on the first elliptical focus 13*a* has the light source main body 12, and the elliptical reflecting surface 13 configured to reflect the light radiated from the light source main body 12 and radiate the light toward the collimating lens 20. Accordingly, the Lambertian-emitted light beam radiated from the light source main body 12 can enter the collimating lens 20 at a narrow diffusion angle (narrow angle) at the second elliptical focus 13*b*. Accordingly, a light intensity in the vicinity of an optical axis AX20 can be increased to form a high illuminance region in the vicinity of the optical axis AX20 of the collimating lens 20 while the light can efficiently enter the collimating lens 20. In addition, by employing such a collimating lens 20, it is possible to obtain an emission having an illuminance gradient in which illuminance decreases going outward from the high illuminance region.

The collimating lens 20 refracts the light radiated from the diffusion center 11*a* of the light source unit 11 to form parallel light. The collimating lens 20 is disposed in front of the light source unit 11. The collimating lens 20 has an incident surface 21 and a light emission surface 25. The incident surface faces the light source unit 11 from the front. The light radiated from the light source unit 11 enters the incident surface 21. The incident surface 21 causes the incident light to become primary light L1 passing through the collimating lens 20. The light emission surface 25 faces the condensing lens 30. The light emission surface 25 refracts light (the primary light L1) entering the collimating lens 20 and emits secondary light L2 toward the condensing lens 30. The secondary light L2 is light parallel to the optical axis AX20 of the collimating lens 20 (i.e., parallel light).

The light emitted from the light source unit 11 is refracted in a direction in which the light approaches the optical axis AX20 of the collimating lens 20 in the incident surface 21 to become the primary light L1 passing through the collimating lens 20. A diffusion angle of a horizontal component of the primary light L1 shown in FIG. 3 is larger than a diffusion angle of a vertical component of the primary light L1 shown in FIG. 2. That is, an angle formed between the horizontal component of the primary light L1 and the optical axis AX20 is larger than an angle formed between the vertical component of the primary light L1 and the optical axis AX20.

More specifically, in the embodiment, the vertical component of the primary light L1 is substantially parallel to the optical axis AX20. That is, the angle formed between the vertical component of the primary light L1 and the optical axis AX20 is substantially 0°. Meanwhile, the horizontal component of the primary light L1 is inclined with respect to the optical axis AX20 in a direction in which the horizontal component is separated from the optical axis AX20 as it goes forward. That is, the horizontal component of the primary light L1 is diffused with respect to the optical axis AX20.

Further, the horizontal component of the light means a traveling direction of light in a surface parallel to a horizontal surface (an X-Z plane), and the vertical component of the light means an advance direction of light in a surface parallel to a vertical surface (a Y-Z plane).

According to the embodiment, the collimating lens 20 refracts the light entering the incident surface 21 to increase a diffusion angle in the horizontal direction with respect to the vertical direction. Accordingly, a light distribution pattern of the light emitted as the parallel light in the light emission surface 25 can be widened in the horizontal direction with respect to in the vertical direction, and a preferable light distribution pattern for a lighting tool for a vehicle can be formed.

In the incident surface 21 of the collimating lens 20, a part of the horizontal component and the vertical component have a hyperbolic shape. In general, a hyperbolic curve is constituted by a pair of continuous curves. In addition, a hyperbolic curve constituted by a pair of curves is drawn with reference to a pair of focuses. The pair of focuses of the hyperbolic curve are disposed inside the curve. A hyperbolic shape means a curve shape of one of the pair of curves. In addition, a hyperbolic focus means one of the pair of focuses with reference to the hyperbolic curve, which is not surrounded by a curve that constitutes a hyperbolic shape. A hyperbolic focus is disposed on the optical axis AX20 of the collimating lens 20 behind the incident surface 21.

As shown in FIG. 2, the vertical component of the incident surface 21 has a hyperbolic shape that causes the hyperbolic focus to coincide with the diffusion center 11*a* of the light source unit 11. Since parameters of the hyperbolic shape are appropriately set according to a refractive index of the collimating lens 20, due to a property of the hyperbolic shape, the light radiated from the hyperbolic focus is refracted in the incident surface 21 having the hyperbolic shape to become parallel light. Accordingly, in the embodiment, the vertical component of the primary light L1 refracted in the incident surface 21 can become parallel to the optical axis AX20. Accordingly, the collimating lens 20 can suppress expansion of the light distribution pattern in the vertical direction radiated forward.

Further, since the vertical component of the primary light L1 is parallel to the optical axis AX20 in the incident surface 21, there is no need to refract the light in the light emission surface 25. Accordingly, the vertical component of the light emission surface 25 has a linear shape perpendicular to the optical axis AX20.

As shown in FIG. 3, the horizontal component of the incident surface 21 has a hyperbolic shape H that causes the hyperbolic focus in the vicinity of the optical axis AX20 to coincide with the diffusion center, and has a shape that moves rearward from the hyperbolic shape H as it is separated outward from the optical axis AX20 in the horizontal direction. As described above, since the parameter of the hyperbolic shape is appropriately set according to the refractive index of the collimating lens 20, due to the property of the hyperbolic shape, the light radiated from the hyperbolic focus is refracted in the incident surface 21 in the vicinity of the optical axis AX20 to become parallel light. Accordingly, in the embodiment, the horizontal component of the primary light L1 refracted in the incident surface 21 can be parallel to the optical axis AX20 in the vicinity of the optical axis AX20. Accordingly, in the vicinity of the optical axis AX20, the density of the light flux emitted from the light emission surface 25 can be increased, and a light distribution pattern in which the vicinity of a center in the horizontal direction is brightened can be realized. In addition, according to the embodiment, the horizontal component of the incident surface 21 moves rearward from the hyperbolic shape as it is separated outward from the optical axis AX20 in the horizontal direction. Accordingly, the horizontal component of the primary light L1 can expand the diffusion angle as it goes outward from the optical axis AX20 in the horizontal direction. Accordingly, the collimating lens 20 can increase expansion of the light distribution pattern in the horizontal direction and realize a light distribution pattern appropriate for the vehicle by diffusing an outer region of the horizontal component of the light.

Further, the horizontal component of the primary light L1 advances in a direction inclined with respect to the optical axis AX20 in the incident surface 21, and is refracted in the light emission surface 25 to be radiated toward the condensing lens 30 as the secondary light L2 parallel to the optical axis AX20. The horizontal component of the light emission surface 25 has a convex shape protruding toward the condensing lens 30.

According to the embodiment, the collimating lens 20 refracts the entering light in the incident surface 21, and increases the diffusion angle in the horizontal direction with respect to the diffusion angle in the vertical direction. Accordingly, the light distribution pattern of the light emitted from the light emission surface 25 as parallel light can be widened in the horizontal direction, and a preferable light distribution pattern for the lighting tool 1 for a vehicle can be formed.

Further, the vertical component of the incident surface 21 means a cross-sectional shape of the incident surface 21 in the vertical direction. In other words, the vertical component of the incident surface 21 means a surface shape of the incident surface 21 in a cross section parallel to the vertical surface (the Y-Z plane) parallel to the optical axis AX20. Similarly, the horizontal component of the incident surface 21 means a cross-sectional shape of the incident surface 21 in the horizontal direction. In other words, the horizontal component of the incident surface 21 means a surface shape of the incident surface 21 in a cross section parallel to the horizontal plane (the X-Z plane).

<Condensing Lens (First Optical System)>

The condensing lens 30 is disposed in front of the light radiation unit 10. The condensing lens 30 functions as a projection lens. An optical axis AX30 of the condensing lens 30 coincides with the optical axis AX20 of the collimating lens 20 of the light radiation unit 10. The condensing lens 30 condenses the light radiated from the light radiation unit 10. The condensing lens 30 configures condensing points 30*a* and 30*b* disposed in front of and behind the condensing lens 30. Here, one of the pair of condensing points 30*a* and 30*b* disposed in front of the condensing lens 30 is referred to as a forward condensing point 30*a*. The other of the pair of condensing points 30*a* and 30*b* disposed behind the condensing lens 30 is referred to as a rearward condensing point 30*b*. The secondary light L2 as parallel light radiated from the light radiation unit 10 is condensed to the forward condensing point 30*a* by the condensing lens 30.

Further, in the embodiment, the pair of condensing points 30*a* and 30*b* coincide with an optical focus of the condensing lens 30. However, the condensing point means that the condensing lens 30 can condense the light most, and does not necessarily have to be a focus in a strict sense.

The condensing lens 30 may be a condensing lens that does not have a strict focus as long as the condensing lens 30 can condense light, and in this case, the condensing point at which the light is most condensed is defined as the condensing point.

Figure 4:
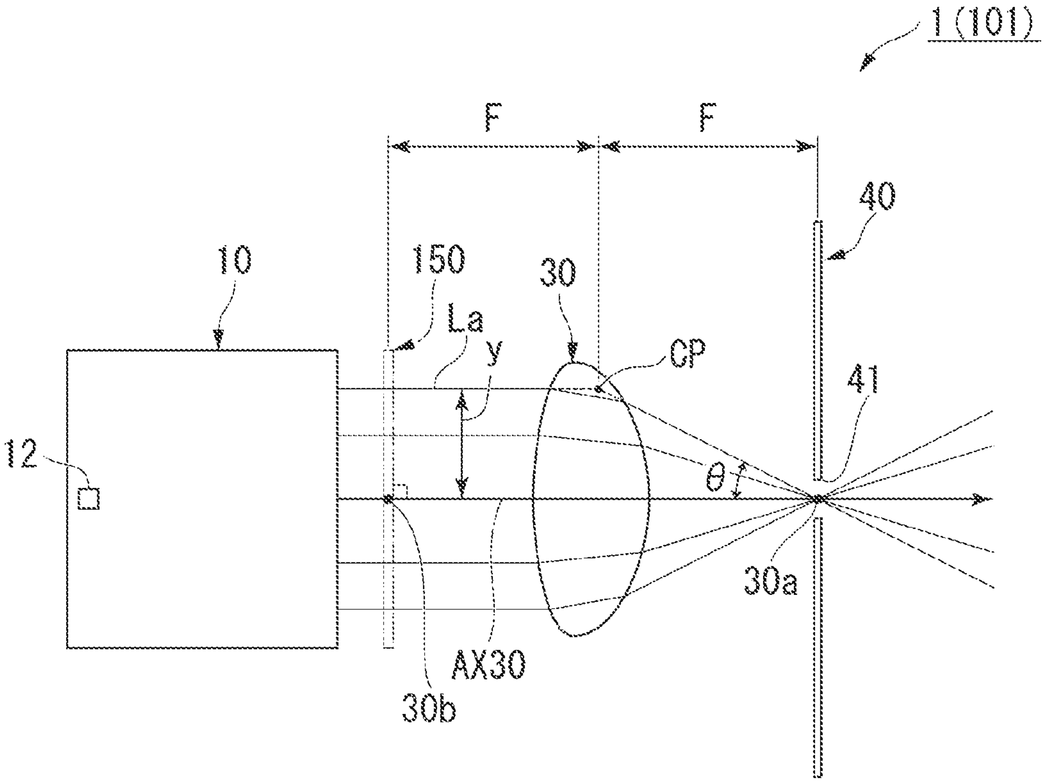
FIG. 4 is a schematic view of a lighting tool for a vehicle of the first embodiment and a second embodiment.

FIG. 4 is a schematic view of the lighting tool 1 for a vehicle of the embodiment. Light La entering the condensing lens 30 through a point separated from the optical axis AX30 of the condensing lens 30 by a distance y in a direction perpendicular to the optical axis AX30 enters a focus (the condensing point 30*a*) of the condensing lens 30 at an angle $\theta = \tan^{-1}(y/F)$ with respect to the optical axis AX30 when an effective focal distance of the condensing lens 30 is F, and then, is projected toward a side in front of the vehicle. Further, the effective focal distance F is a distance from an intersection point CP in a lens of an extension line of an optical path before and after entering and exiting the condensing lens 30 to a focus (the condensing points 30*a* and 30*b*). According to the above-mentioned equation, a light distribution pattern of a surface distribution appropriate for the vehicle formed as parallel light by the collimating lens 20 is converted into light having a predetermined angle and projected to a side in front of the vehicle.

In the embodiment, the condensing lens 30 is a convex lens in which a rearward surface is a plane and a forward surface is a convex surface. However, the condensing lens 30 is an example of a first optical system configured to condense light to the forward condensing point 30*a*, and a configuration thereof is not limited to the embodiment. For example, as the first optical system, instead of the condensing lens 30, a plurality of optical systems may be configured to be arranged in a forward/rearward direction as optical axes thereof coincide with each other. Further, FIG. 4 is a schematic view, and a forward surface and a rearward surface of the condensing lens 30 are shown as convex surfaces. In this way, the condensing lens 30 may have the forward surface and the rearward surface that are convex surfaces.

<Cover Member>

The cover member 40 has a plate shape. The cover member 40 is disposed in front of the condensing lens 30. The cover member 40 overlaps at least a part of the condensing lens 30 when seen from the front. That is, the cover member 40 covers the condensing lens 30 from the front. A forward surface 40*a* of the cover member 40 functions as a designed surface. That is, the forward surface 40*a* of the cover member 40 makes it difficult to see an internal structure including the condensing lens 30 and the light radiation unit 10 when seen from the front. Accordingly, the cover member 40 enhances a design property of the lighting tool 1 for a vehicle.

The opening 41 passing in the forward/rearward direction is formed in the cover member 40. In the embodiment, the opening 41 is a pinhole. The opening 41 may be, for example, a slit extending in one direction. In addition, a shape of the opening 41 may be a shape widened in the horizontal direction according to a shape of a light distribution pattern radiated in front.

The opening 41 is disposed on the optical axis AX30 of the condensing lens 30. The parallel light (the secondary light L2) radiated from the light radiation unit 10 is refracted by the condensing lens 30 and condensed onto the optical axis AX30 of the condensing lens 30. Accordingly, light having a narrowed passing range can pass through the opening 41 by disposing the opening 41 on the optical axis AX30 of the condensing lens 30. That is, the opening 41 can be reduced to make it difficult to see the internal structure of the lighting tool 1 for a vehicle by disposing the opening 41 on the optical axis AX30 of the condensing lens 30.

In addition, in the embodiment, the opening 41 is located at the forward condensing point 30*a* of the condensing lens 30. The light refracted by the condensing lens 30 is most condensed to the forward condensing point 30*a*.

The opening 41 can be most reduced by disposing the opening 41 on the forward condensing point 30*a*, and as a result, the cover member 40 can enhance an effect of making it difficult to see the internal structure of the lighting tool 1 for a vehicle.

According to the embodiment, the cover member 40 overlapping at least a part of the condensing lens 30 is provided in front of the condensing lens 30. For this reason, the internal structure is shielded from the front, and the lighting tool 1 for a vehicle having enhanced design properties can be realized. In addition, the opening 41 located on the optical axis AX30 of the condensing lens 30 is formed in the cover member 40. The light parallelized by the light radiation unit 10 enters the condensing lens 30, and is condensed on the optical axis AX30 to pass through the opening 41. Accordingly, the light radiated in front is not shielded by the cover member 40.

In addition, according to the embodiment, since the forward surface 40*a* of the cover member 40 functions as a designed surface, a size of the designed surface can be determined without being restricted by the size of the condensing lens 30. Accordingly, it is possible to provide the lighting tool 1 for a vehicle having enhanced design properties and a compact appearance.

In addition, according to the embodiment, a distribution having an illuminance gradient is generated in the parallel light (the secondary light L2) radiated from the light radiation unit 10 by appropriately designing the incident surface 21 and the light emission surface 25 of the collimating lens 20. Accordingly, the lighting tool 1 for a vehicle can form a light distribution pattern in which illuminance decreases going outward from the high illuminance region (see FIG. 5 and FIG. 6).

Further, in the embodiment, the case in which a configuration of causing parallel light to enter the condensing lens 30 is employed as the light radiation unit 10 has been described. However, the light radiation unit 10 may not necessarily radiate parallel light as long as the light can be condensed toward the front by the condensing lens 30. Further, when the light radiation unit 10 radiates parallel light, it is, more preferably, possible to clearly condense the light using the condensing lens 30 having a simple surface shape.

Second Embodiment

Next, a lighting tool 101 for a vehicle of a second embodiment will be described with reference to FIG. 4. The lighting tool 101 for a vehicle of the second embodiment is mainly distinguished from the above-mentioned embodiment in that an image light-forming device 150 is provided. Further, the same components as those of the above-mentioned embodiment are designated by the same reference numerals and description thereof will be omitted.

The lighting tool 101 for a vehicle includes the image light-forming device 150 configured to form image light, in addition to the light radiation unit 10, the condensing lens (the first optical system) 30 and the cover member 40. The image light-forming device 150 modulates the light and forms the image light. In the embodiment, the image light-forming device 150 is a transmission type liquid crystal panel that forms image light when light passes therethrough. However, the image light-forming device 150 may be a reflection type liquid crystal panel, or may be a digital mirror device (DMD) which forms image light when reflecting light and in which a plurality of pivotable micromirrors are arranged in an array (matrix). The light entering the condensing optical system can become image light by disposing the image light-forming device 150 in a route from the light source main body 12 to the condensing lens 30, and a light distribution pattern radiated in front can be changed over time. That is, according to this configuration, the lighting tool for a vehicle can control an adaptive driving beam (ADB).

Hereinafter, in the description of the embodiment, the image light formation device is referred to as a liquid crystal panel 150.

The liquid crystal panel 150 is disposed between the light radiation unit 10 and the condensing lens 30. That is, the image light is formed by passing some of the light that becomes parallel light by the light radiation unit 10 through the liquid crystal panel 150 and shielding the other light. Since the light passing through the liquid crystal panel 150 can become parallel light by disposing the liquid crystal panel 150 between the light radiation unit 10 and the condensing lens 30, clearer image light can be formed. That is, according to the embodiment, a clearer light distribution pattern can be formed by forming the image light through the liquid crystal panel 150 using the parallel light radiated from the light radiation unit 10.

In addition, the liquid crystal panel configured to diffuse the passing light may be used as the liquid crystal panel 150. The diffused light is not condensed to the forward condensing point 30*a* by the condensing lens 30.

Accordingly, the diffused light cannot easily pass through the opening 41 of the cover member 40, and the light distribution pattern radiated in front can become clear.

The liquid crystal panel 150 is disposed to be perpendicular to the optical axis AX30 of the condensing lens 30 at the rearward condensing point 30*b* of the condensing lens 30. The lighting tool 101 for a vehicle projects the image light passing through the rearward condensing point 30*b* of the condensing lens 30 toward the front as the light distribution pattern. Meanwhile, since it is difficult to form only the completely parallel light in the light radiation unit 10, the light radiated from the light radiation unit 10 includes some non-parallel light. When the liquid crystal panel is not disposed at a rearward condensing point of the condensing lens, the non-parallel light radiated from the light radiation unit 10 passes a rear focus (the rearward condensing point 30*b*), the image light becomes unclear, and as a result, the light distribution pattern on the front may become unclear. According to the embodiment, since the liquid crystal panel 150 is disposed to be perpendicular to the optical axis AX30 of the condensing lens 30 at the rearward condensing point 30*b* of the condensing lens 30, the non-parallel light also passes through the rearward condensing point 30*b* and passes through the liquid crystal panel 150 in a plane perpendicular to the optical axis AX30.

Accordingly, according to the lighting tool 101 for a vehicle of the embodiment, a clearer light distribution pattern can be formed.

In general, the liquid crystal component used in the liquid crystal panel is known to change its transmissive performance according to an incident angle of the light. That is, the liquid crystal component has a property in which, while a contrast (a light and shade transmissivity ratio) is mostly increased with respect to the light from a specified angle (for example, a direction perpendicular to the liquid crystal panel), the contrast is decreased as it is deviated from a specified angle. For this reason, when the light entering the liquid crystal component has an angular distribution, the light and shade transmissivity ratio of the entire image light may be also decreased according to a decrease in contrast of a region in which the light most deviated from the specified angle enters.

According to the embodiment, by disposing the liquid crystal panel 150 to be perpendicular to the parallel light, it is possible to use only the light having the incident angle with the highest contrast of the liquid crystal panel 150, and increase the light and shade transmissivity ratio of the image light. That is, according to the embodiment, it is possible to provide the lighting tool 101 for a vehicle configured to form a clear light distribution pattern.

In this way, the liquid crystal panel 150 exhibits a high performance when the parallel light enters. Accordingly, the lighting tool 101 for a vehicle of the embodiment is most effective when the liquid crystal panel 150 is used as the image light-forming device.

According to the embodiment, in addition to the above-mentioned effect obtained by providing the liquid crystal panel 150, the same effects as those of the first embodiment can be exhibited.

EXAMPLES

Hereinafter, the effects of the present invention will be made clearer by the examples. Further, the present invention is not limited to the following examples and may be appropriately modified without departing from the scope of the present invention.

[Light Distribution Pattern Corresponding to First Embodiment]

Figure 5:
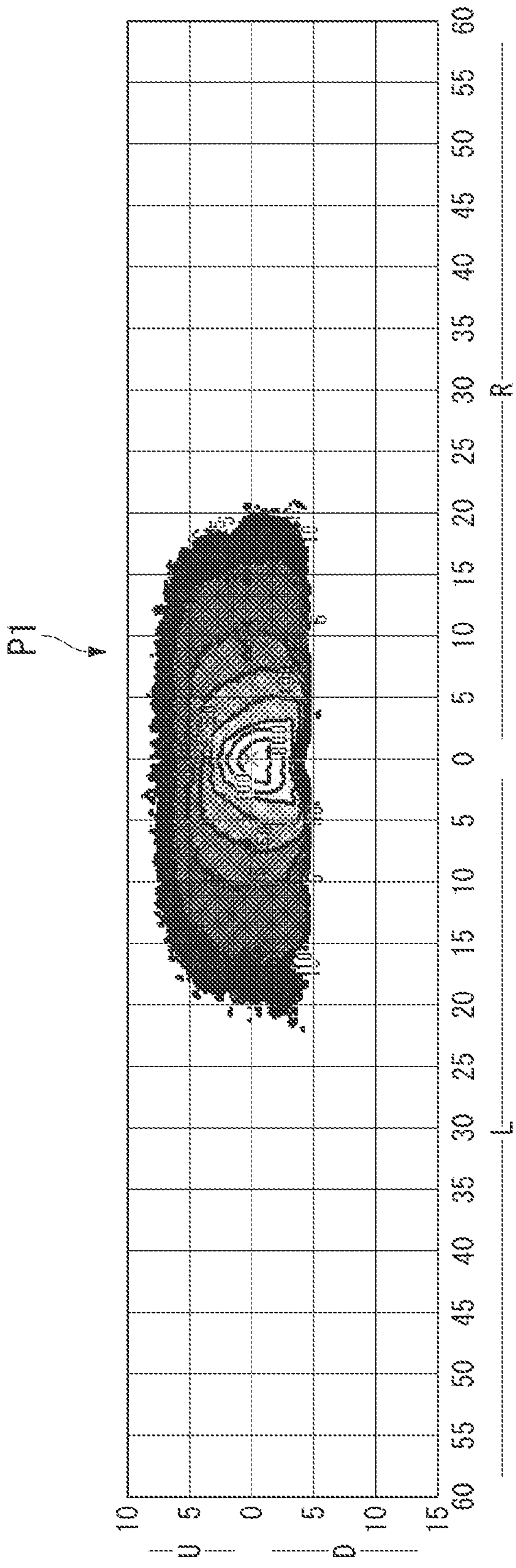
FIG. 5 is a view showing a simulation result of a light distribution pattern of the first embodiment.

FIG. 5 shows a simulation result of a light distribution pattern P1 in the lighting tool 1 for a vehicle of the above-mentioned first embodiment with respect to a virtual vertical screen facing the lighting tool 1 for a vehicle. Further, in the simulation, an effective lens height of the condensing lens 30 is 30 mm, and a dimension of the cover member 40 in the vertical direction is 10 mm.

As shown in FIG. 5, in the light distribution pattern P1, a width is increased in the horizontal direction with respect to the vertical direction while a high illuminance band is provided at a center, and a preferable shape as a light distribution pattern of the lighting tool for a vehicle is provided. In addition, when a total light flux of the light distribution pattern P1 is confirmed, efficiency of utilization of the light is set to 50% or more even though light loss in an outer lens (omitted in FIG. 1 to FIG. 3) is considered. Accordingly, according to the lighting tool 1 for a vehicle of the first embodiment, the preferable light distribution pattern P1 with high efficiency and enhanced design properties can be formed. Further, the efficiency of utilization of the light is an index that expresses a ratio of the light flux radiated forward to the total light flux radiated from the light source main body as a percentage.

[Light Distribution Pattern Corresponding to Second Embodiment]

Figure 6:
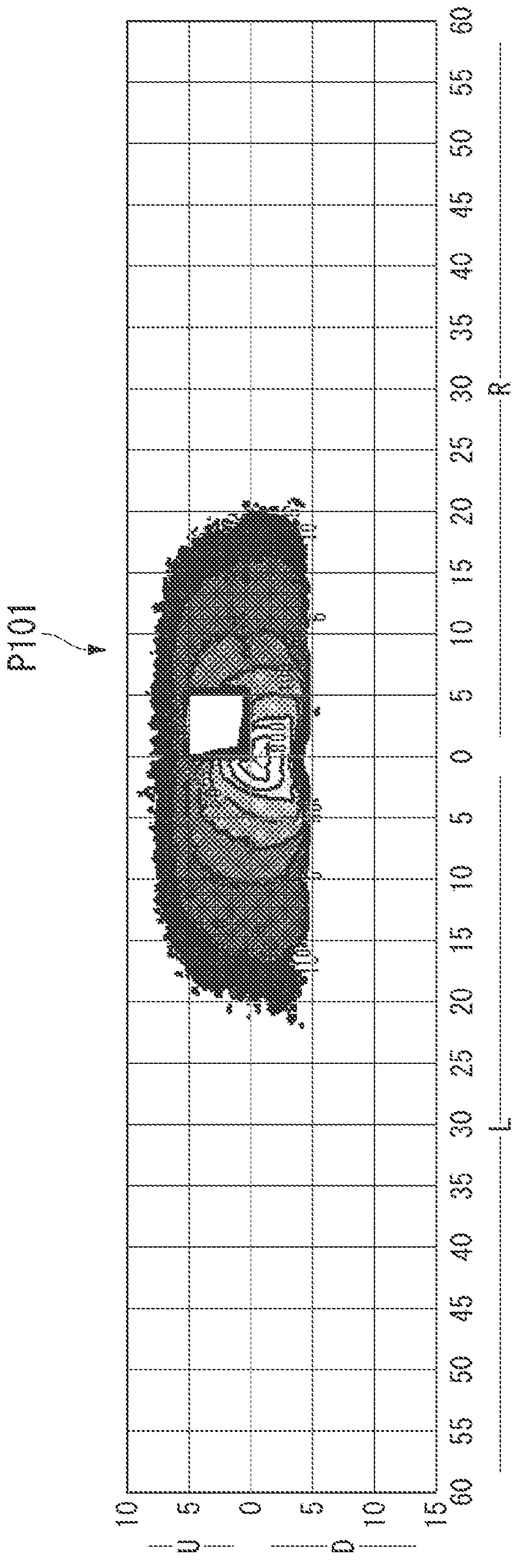
FIG. 6 is a view showing a simulation result of a light distribution pattern of the second embodiment.

FIG. 6 shows a simulation result of the light distribution pattern P101 in the lighting tool 101 for a vehicle of the above-mentioned second embodiment with respect to a virtual vertical screen facing the lighting tool 101 for a vehicle.

Further, in the simulation, the liquid crystal panel 150 shields some of the passing light (a region of a central right upper side in the light distribution pattern P101).

As shown in FIG. 5, the light distribution pattern P101 corresponding to the second embodiment can form a region to which the light is not radiated partially while exhibiting the same effects as those of the light distribution pattern P1 corresponding to the first embodiment. That is, according to the light distribution pattern P101 corresponding to the second embodiment, ADB control of partially masking radiation of light can be clearly performed.

Hereinabove, while the various embodiments of the present invention have been described, the configurations and combinations thereof in the embodiments are exemplary, and additions, omissions, substitutions, and other modifications may be made without departing from the scope of the present invention. In addition, the present invention is not limited to the embodiment.

DESCRIPTION OF THE REFERENCE SYMBOLS

1, 101 Lighting tool for a vehicle
10 Light radiation unit
11 Light source unit
11*a* Diffusion center
12 Light source main body
13 Elliptical reflecting surface
13*a*, 13*b* Elliptical focus
20 Collimating lens (second optical system)
21 Incident surface
25 Light emission surface
30*a* Forward condensing point (condensing point)
30*b* Rearward condensing point (condensing point)
40 Cover member
41 Opening
150 Image light-forming device (liquid crystal panel)
AX20, AX30 Optical axis
L1 Primary light
L2 Secondary light

The invention claimed is:

1. A lighting tool for a vehicle configured to radiate light toward a side in front of a vehicle, the lighting tool for a vehicle comprising:

a light radiation unit having a light source main body;

a first optical system configured to condense light radiated from the light radiation unit; and a cover member disposed in front of the first optical system and configured to overlap at least a part of the first optical system when seen from the front, wherein an opening disposed on an optical axis of the first optical system is provided in the cover member, the light radiation unit has: a light source unit having the light source main body and configured to radially radiate light from a diffusion center; and a second optical system configured to cause the light radiated from the light source unit to become the parallel light, the second optical system has: an incident surface into which the light radiated from the light source unit enters and which is configured to cause the incident light to become primary light passing through the second optical system; and a light emission surface configured to emit secondary light parallel to an optical axis of the second optical system, and a horizontal component of the incident surface has a hyperbolic shape that causes a hyperbolic focus to coincide with the diffusion center in a vicinity of the optical axis of the second optical system, and has a shape that moves rearward from a hyperbolic shape going outward from the optical axis of the second optical system in a horizontal direction.

2. The lighting tool for a vehicle according to claim 1, wherein the opening is disposed at a condensing point in front of the first optical system.

3. The lighting tool for a vehicle according to claim 1, wherein the light radiation unit radiates light radiated from the light source main body as parallel light.

4. The lighting tool for a vehicle according to claim 3, wherein the parallel light has a distribution with an illuminance gradient.

5. The lighting tool for a vehicle according to claim 1, wherein the light source unit has the light source main body and an elliptical reflecting surface configured to reflect the light radiated from the light source main body and radiate the light toward the second optical system, the elliptical reflecting surface is configured in an elliptical shape with reference to a pair of elliptical focuses, and the light source main body is disposed on one of the pair of elliptical focuses, and the other of the pair of elliptical focuses functions as the diffusion center.

6. The lighting tool for a vehicle according to claim 1, wherein a diffusion angle of a horizontal component of the primary light is larger than a diffusion angle of a component of the primary light in a vertical direction.

7. The lighting tool for a vehicle according to claim 6, wherein a vertical component of the incident surface has a hyperbolic shape that causes a hyperbolic focus to coincide with the diffusion center.

8. The lighting tool for a vehicle according to claim 1, comprising an image light-forming device disposed in a route of light from the light source main body to the first optical system and configured to modulate light to form image light.

9. The lighting tool for a vehicle according to claim 8, wherein the image light-forming device is a liquid crystal panel, and the liquid crystal panel is disposed between the light radiation unit and the first optical system.

10. The lighting tool for a vehicle according to claim 9, wherein the liquid crystal panel is disposed to be perpendicular to the optical axis of the first optical system at a condensing point behind the first optical system.

11. The lighting tool for a vehicle according to claim 9, wherein the liquid crystal panel shields some of passing light.

12. A lighting tool for a vehicle configured to radiate light toward a side in front of a vehicle, the lighting tool for a vehicle comprising:

a light source;

a light radiation unit that radiates light radiated from the light source as parallel light;

a first optical system configured to condense light radiated from the light radiation unit; and a cover member disposed in front of the first optical system and configured to overlap at least a part of the first optical system when seen from the front, wherein an opening disposed on an optical axis of the first optical system is provided in the cover member, the light radiation unit has: a light source unit configured to radially radiate the light radiated from the light source toward a second optical system: and the second optical system configured to cause the light radiated from the light source unit to become the parallel light, the second optical system has: an incident surface into which the light radiated from the light source unit enters and which is configured to cause the incident light to become primary light passing through the second optical system: and a light emission surface configured to emit secondary light parallel to an optical axis of the second optical system, a diffusion angle of a horizontal component of the primary light is larger than a diffusion angle of a component of the primary light in a vertical direction, and a horizontal component of the incident surface has a hyperbolic shape that causes a hyperbolic focus to coincide with the diffusion center in a vicinity of the optical axis of the second optical system, and has a shape that moves rearward from a hyperbolic shape going outward from the optical axis of the second optical system in a horizontal direction.

13. The lighting tool for a vehicle according to claim 12, wherein the liquid crystal panel shields some of passing light.

14. The lighting tool for a vehicle according to claim 12, wherein the opening is disposed at a condensing point in front of the first optical system.

15. The lighting tool for a vehicle according to claim 12, wherein the parallel light has a distribution with an illuminance gradient.

16. The lighting tool for a vehicle according to claim 12, wherein a vertical component of the incident surface has a hyperbolic shape that causes a hyperbolic focus to coincide with the diffusion center.

17. The lighting tool for a vehicle according to claim 12, comprising an image light-forming device disposed in a route of light from the light source to the first optical system and configured to modulate light to form image light.

18. The lighting tool for a vehicle according to claim 12, wherein the image light-forming device is a liquid crystal panel, and the liquid crystal panel is disposed between the light radiation unit and the first optical system.

19. The lighting tool for a vehicle according to claim 12, wherein the liquid crystal panel is disposed to be perpendicular to the optical axis of the first optical system at a condensing point behind the first optical system.

* * * * *